United States Patent [19]

Peters

[11] Patent Number: 5,593,254

[45] Date of Patent: Jan. 14, 1997

[54] GENERATING MILLING CUTTER

[75] Inventor: Walter Peters, Hohnstorf, Germany

[73] Assignee: Wilhelm Fette GmbH, Schwarzenbek, Germany

[21] Appl. No.: 300,323

[22] Filed: Sep. 2, 1994

[30] Foreign Application Priority Data

Sep. 9, 1993 [DE] Germany ................ 43 30 484.2

[51] Int. Cl.$^6$ ................................................ B23C 5/20
[52] U.S. Cl. ................................................ 407/48; 407/56
[58] Field of Search ................................ 407/28, 35, 40, 407/47, 48, 49, 51, 53, 56, 5, 6, 7, 52, 54, 55, 59, 60

[56] References Cited

U.S. PATENT DOCUMENTS

| | | |
|---|---|---|
| 2,498,721 | 2/1950 | Stafford . |
| 3,137,059 | 6/1964 | Hertel ................................ 407/6 X |
| 3,710,468 | 1/1973 | Calvert ................................ 407/6 |
| 5,141,367 | 8/1992 | Beeghly et al. ..................... 407/119 |

FOREIGN PATENT DOCUMENTS

| | | |
|---|---|---|
| 1502076 | 5/1973 | Germany . |
| 1260926 | 2/1986 | Germany . |
| 3725154 | 2/1988 | Germany . |

*Primary Examiner*—M. Rachuba
*Assistant Examiner*—Henry W. H. Tsai
*Attorney, Agent, or Firm*—Vidas, Arrett & Steinkraus, P.A.

[57] ABSTRACT

A generating milling cutter including a supporting body having a plurality of circumferentially and, if desired, axially spaced supporting teeth, each having a radial seat surface and a second seat surface which extends at the root of the supporting teeth substantially perpendicularly thereto for receiving cutting blades or cutting ledges of heavy duty material adapted to be mounted to the teeth. The seat surfaces of the cutting blades or cutting ledges cooperate with a rearward first abutment surface and a lower second abutment surface. The cutting blades or ledges include at their rearside at least a third abutment surface which extends transversely to the rearward first and second abutment surfaces and cooperates with at least one complementary third seat surface of the supporting teeth. The cutting blades or ledges are adapted to be removably fixed to the supporting teeth by a clamping device which includes a threaded bolt such that the cutting blades or ledges have their third abutment surface urged against the third seat surface in addition to being urged against the radial and lower seat surfaces.

6 Claims, 2 Drawing Sheets

GENERATING MILLING CUTTER

The invention relates to a generating milling cutter.

BACKGROUND OF THE INVENTION

Generating milling cutters belong to the so-called toothing tools which compete with grinding tools in the manufacturing of heavy duty transmissions such as for example for rolling machines, crans, diggers or textile machines. For the smoothing of hardened gears having straight or inclined toothings it has become known to use milling cutters having supporting teeth disposed along a helical line at the periphery of a supporting body and to mount thereon hard cutting blades which consist e.g. of carbides. As to the cutting blades initially blanks are formed which subsequently are soldered to the supporting teeth. Thereafter a grinding operation is performed on the milling cutter by a relatively complicated grinding method. Such milling cutters operate satisfactorily, however, do have some advantages.

The soldered hard metal tips are extremely temperature sensitive. The soldering operation may cause stresses and accordingly fissures and ruptures. As already mentioned, the cutting tips are ground while they are on the supporting body. Such machining may result in differently heated zones in the area of the cutting tips, which also may cause fissures and ruptures. If, in the making of a milling cutter, just one cutting edge will be damaged, there is no possibility to replace the latter; on the contrary the total milling cutter has to be considered to be scrap because renewed soldering will cause a deformation of the basic body.

The cutting edges have to be reground from time to time. To this end a special grinding machine is required which must be available at the user's if he does not wish to return the milling cutter to the manufacturer for grinding purposes.

The cutting edges of hard metal are very delicate. Accordingly, in the handling of the milling cutter it may readily occur that the cutting edges break when they are hit by other objects. Also in this case the total milling cutter cannot be used any longer.

For reasons of increased stability under load and high quality machining it is often desired to provide the cutting edges with a corresponding coating, for example of titanium nitride (TIN). Such a coating must be provided after the cutting tips have been mounted and ground. Accordingly, it is necessary to introduce the total supporting body into a coating oven which causes problems with respect to large volume milling cutters because most of the coating ovens are of too small receiving capacity. Furthermore, the coating operation is affected by soldering gases and the soldering connection will be of reduced strength.

The problem to be solved by the invention is to provide a generating milling cutter of the above-identified type, the making of which results in minimal scrap, which enables the use of cutting blades of hard metal or cermet and which allows for simple regrinding by the user.

SUMMARY OF THE INVENTION

This problem is solved by the features of the invention disclosed and claimed herein.

In the milling cutter of the invention, the cutting tips (cutting blades or ledges) are separate parts which are removably fixed to the teeth of the milling cutter by means of a suitable clamping device. Furthermore it is important that the cutting tips have, at their rear side, a third abutment surface which extends transversely to the first and second abutment surfaces and which cooperates with a complementary third seat surface of the teeth. By means of the clamping device the cutting tip has its third abutment surface urged against the third seating surface additionally to being urged against the radial and lower seating surfaces at the teeth.

Also with respect to the milling cutter of the invention cutting tip blanks are initially fixed to the supporting body; however, a precise reproducible position is obtained by means of said seating and abutment surfaces. After the cutting tips have been clamped, they are ground in a known manner. It may occur that, due to manufacturing tolerances of the blanks and the supporting teeth, the individual cutting tips are not of absolutely identical dimensions. If, however, the ground cutting tips are associated with their respective teeth on which they were ground, the cutting tips may be removed from the supporting body without any problems after they have been ground. Accordingly the invention allows to produce a pair or more complete sets of cutting tips, of which the individual cutting tips of each set are associated with the respective teeth in a predetermined manner. Accordingly, the buyer or user may buy a further set of cutting tips when he obtains a milling cutter in accordance with the invention so that he will be in a position to replace a damaged cutting tip by another cutting tip provided for the respective supporting tooth. A further advantage is that the user may remove the cutting tips from the supporting body and sharpen them by means of simple plane grinding machines. The use of expensive special grinding machines, accordingly, is not necessary. If, however, the user possesses only one set of cutting tips, he has to return the supporting body to the manufacturer so that the latter will replace the cutting tips or mount a completely new set of cutting tips along with the respective necessary grinding operation.

A further advantage of the invention is that it is possible to use materials for the cutting tips which could not be used heretheretofore due to their lacking soldering qualities. Among these is in particular e.g. cermet which is of an increased stability under load and allows for excellent machining quality.

Altogether, the milling cutter of the invention reduces substantially the user's expenditure for the use of such tools which will simplify the machining of gears.

There are various structural possibilities to provide the third abutment surface. One possibility, according to the invention, is to provide the third abutment surface at a key on the rearside of the cutting blade, which key cooperates with a groove formed in the radial seat surface. Accordingly, one wall of the groove forms the third seat surface. According to a further embodiment of the invention, the key extends substantially radially, and the groove and key are disposed substantially centrally in the seat plate or the radial seat surface, respectively.

For the required precisely reproducible position of the cutting edges it is not necessary that the groove and key fittingly cooperate, which, however, is provided in one embodiment of the invention in an advantageous manner. The clamping device has the effect that there is always only a pressing of the third abutment surface against the third seat surface. A simultaneous pressing thereof against two walls of the groove is excluded thereby. Mounting the key in a groove without any play has the further advantage that displacement of the cutting tip as a result of vibrations is omitted, which otherwise could not be completely omitted in operation.

One embodiment of the clamping device of the present invention consists in that the cutting blade has a through-bore or a clamping bolt which cooperates with a corresponding threaded bore in the radial seat surface of the supporting teeth. According to a further embodiment of the invention, the threads of the clamping bolt and threaded bore in a right-hand milling cutting has a left-hand turn and a corresponding offset so that the cutting tip is moved into abutment with all three seat surfaces of the supporting tooth when the clamping bolt is tightened.

In some cases it is not possible due to a limited space situation (small pitch) to pass a clamping bolt through the cutting tip and to tighten it. This is why a further embodiment of the invention provides that the cutting blades include a through-bore for a clamping bolt.

BRIEF DESCRIPTION OF THE DRAWINGS

In the following the invention will be explained in more detail with respect to drawings.

DESCRIPTION OF THE PREFERRED EMBODIMENTS

Figure 1:
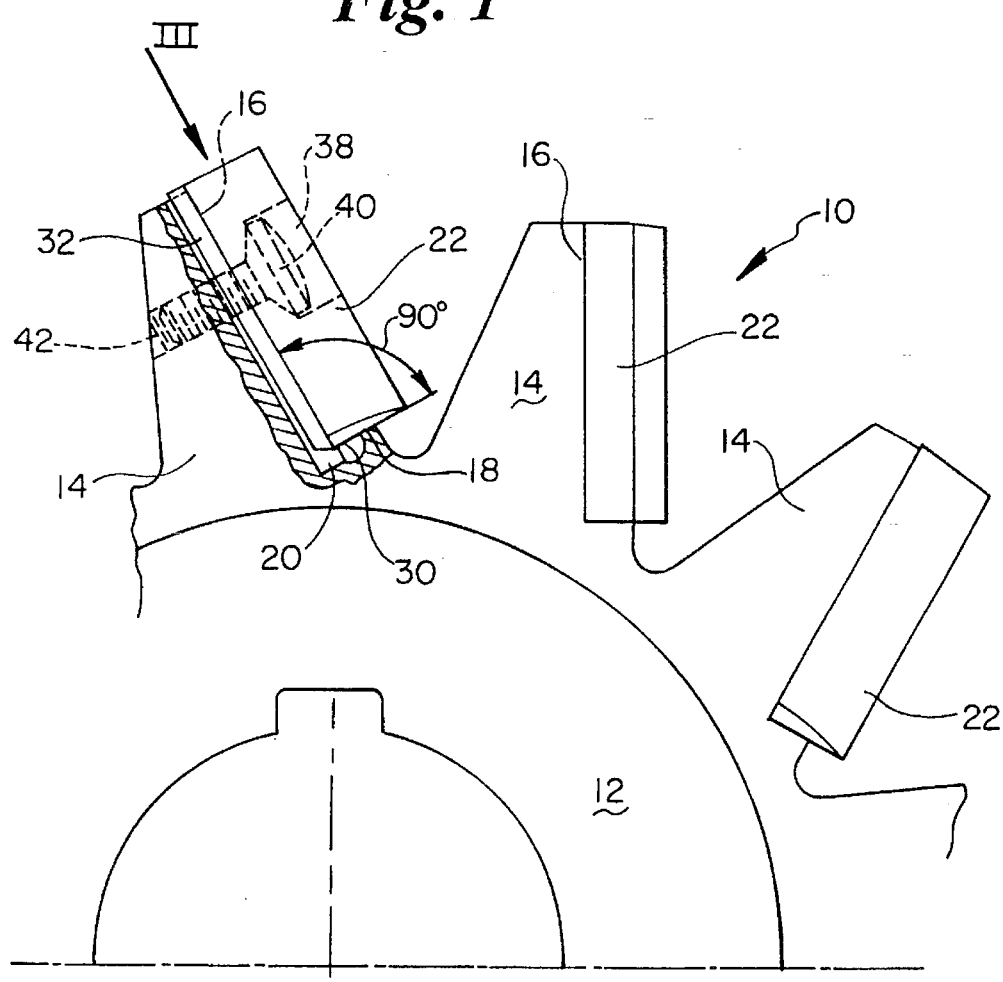
FIG. 1 shows schematically a side elevation of a part of a generating milling cutter of the invention.

FIG. 1 shows a generating milling cutter 10, the supporting body 12 of which includes, in a manner known per se, individual radial supporting teeth 14 disposed at the periphery of the supporting body 12 along a helical line. The supporting teeth 14 include a radial seat surface 16 and a lower seat surface 18 which extends approximately at right angles to the seat surface 16. As may be seen in FIG. 3, the seat surface 16 has formed therein a groove 20 which extends centrally and radially on tooth 14. It is also perpendicular to the second seat surface 18.

Figure 2:
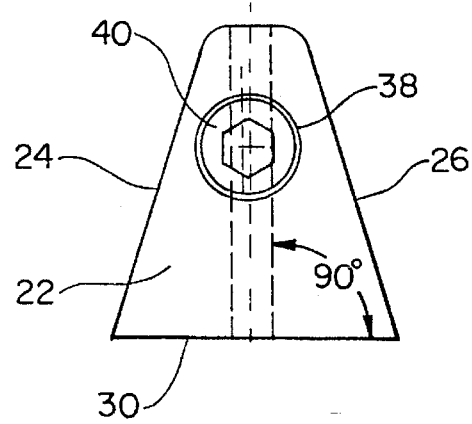
FIG. 2 shows a front elevation of a cutting tip of the milling cutter of FIG. 1.
Figure 3:
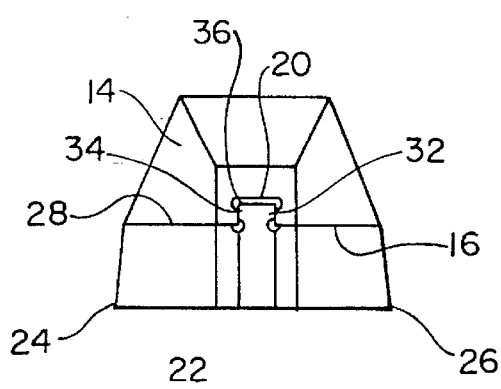
FIG. 3 shows an elevation from above of a tooth of the milling cutter of FIG. 1 in the direction of arrow 3 of FIG. 1.

The supporting teeth 14 receive cutting tips or cutting blades 22 having a contour as shown in FIGS. 2 and 3. They form a pair of radially outwardly converging cutting edges 24, 26. The cutting blades 22 are of trapezoidal cross-section, i.e. they taper towards the supporting tooth 14. The cutting blades 22 have a rear abutment surface 28 which comes into engagement with the seat surface 16 of the tooth 14. They include a lower abutment surface 30 which cooperates with the seat surface 18. At the rearside a key 32 of approximately rectangular cross-section extends approximately radially and centrally. The key 32 is received in the groove 20 without play. This provides a further seat surface of the supporting tooth 14 and an abutment surface of the cutting blade 22 which has been designated by 36 and 34, respectively.

As is shown in FIGS. 1 and 2, the cutting blades 22 have a through-bore 38 for receiving a clamping bolt 40, the threaded shaft of which cooperates with a threaded bore 42 in the tooth 14. As may be seen in FIG. 2 the bore 38 is arranged slightly eccentrically and is provided with left-hand threads and allows to clamp the blade 22 in FIG. 2 to the left and in FIG. 3 to the right when the bolt 40 is tightened. Furthermore, there is a clamping of surfaces 18 and 30 and, respectively, surfaces 16 and 28 so that the cutting blade 22 is in a precise reproducible position along three orthogonal axes.

As already mentioned, the blades 22 are roughly machined, are clamped to the supporting teeth 14 and thereafter are subjected to a finishing operation by grinding. Due to different tolerances each cutting blade has specific dimensions. This, however, is of no relevance if the cutting blades 22 are clamped to the associated tooth in the precise seat after they had been released. This is why the cutting blades 22 may be readily removed from the supporting body 12 for sharpening and coating purposes and may be machined by means of conventional plane grinding machines.

Figure 4:
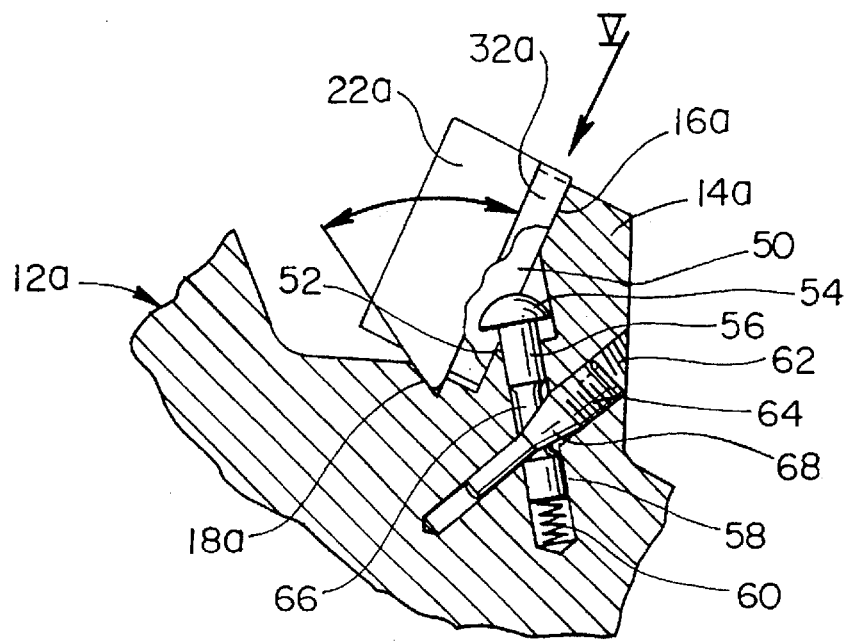
FIG. 4 shows a cross-section of a supporting body of a modified milling cutter having a modified cutting tip and a corresponding clamping device.
Figure 5:
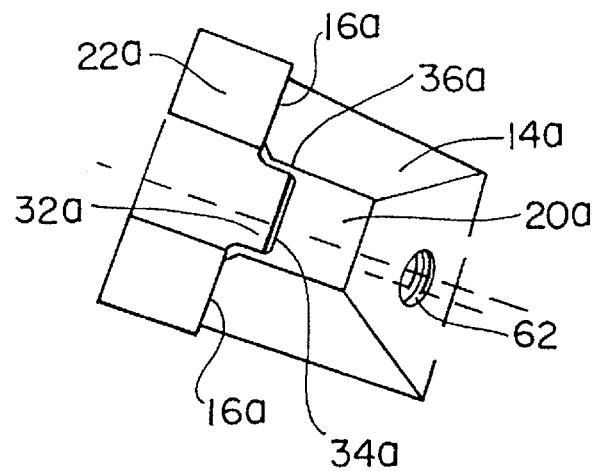
FIG. 5 shows an elevation from above of a tooth of a milling cutter of FIG. 4 in the direction of arrow 5.

In FIGS. 4 and 5 a supporting body 12a having supporting teeth 14a is indicated. Again the supporting teeth include a first seat surface 16a and a second seat surface 18a with the latter extending to the seat surface 16a under an angle different than 90°. As may be seen in FIG. 5, the seat surface 16a includes again a central groove 20a provided with a seat surface 36a at a wall of the groove. The cutting blade 22a which is similar to blade 22 as to its cutting dimensions includes at the rearside a key 32a which cooperates with the groove 20a without play in a similar manner as the key 32 in the groove 20 of the embodiment of FIGS. 1 to 3. Insofar both embodiments are substantially similar. However, the cutting blades 22a are clamped to the supporting teeth 14a in a different manner.

As may be seen in FIG. 4 the key 32a has at its rearside a recess 50 which at a lower clamping surface 52 cooperates with the head 54 of a pin 56 which is guided in an obligue bore 58 in the supporting body 12a. A spring 60 biases the pin 56 outwardly. A clamping bolt 64 is threaded into a threaded bore 62 extending transversely thereto. The clamping bolt extends transversely to the clamping pin 56 in a reduced area 66 which cooperates with a conical portion 68 of the clamping bolt 64. The bore 62 is open towards the rearside of the supporting tooth 14a for actuation of the clamping bolt 64. When the clamping bolt 64 is inserted into the bore 62 by rotation, the clamping pin 56 is urged downwards so that the cutting blade 22a is clamped against the three seat surfaces 18a, 16a and 36a of the supporting tooth 14a.

The latter clamping device allows to mount the cutting blades 22a in a situation where the supporting teeth 14a are of a small pitch which would not allow the use of bolts as in the embodiment of FIGS. 1 to 3.

I claim:

1. A hobbing cutter comprising a support body having a plurality of outwardly extending supporting teeth circumferentially and selectively, axially spaced, the support teeth having an inward portion, a radially extending first seating surface having a groove and a second seating surface at the inward portion of the support teeth, said support teeth extending substantially perpendicularly to said second seating surface, said first and said second seating surfaces being adapted to accommodate cutting inserts having lateral cutting edges on opposite sides and which converge radially outwards, said cutting inserts being of heavy duty material adapted to be mounted on the support teeth, said cutting inserts having a rearward first contact surface and a lower second contact surface engaging said first and said second seating surfaces, respectively, said cutting inserts being ground on said supporting teeth and each associated with a corresponding tooth, the cutting inserts further having a key on the rear side having a third contact surface which extends transversely to said first and said second contact surfaces and cooperates with the groove formed in said first seating surface, the interengagement of said key and said groove being substantially backlash-free, and said cutting inserts being adapted to be removably fixed to the supporting teeth by a clamping means, the clamping means including a threaded bolt cooperating with a threaded bore of said supporting teeth such that said first and said second contact surfaces are urged against said first and said second seating surfaces, respectively, and said third contact surface is urged against the wall of said groove in said support tooth.

2. The hobbing cutter of claim 1, wherein said key and said groove extend approximately centrally on said cutting insert and said first contact surface, respectfully.

3. The hobbing cutter of claim 1, wherein said threaded bolt has a left-hand thread.

4. The hobbing cutter of claim 1, wherein said cutting inserts are made of a material chosen from the group consisting of hard metal, TiN coated metal and cermet.

5. The milling cutter of claim 1, wherein the groove and the key cooperate without play.

6. A hobbing cutter comprising a support body having a plurality of outwardly extending supporting teeth circumferentially and selectively, axially spaced, the support teeth having an inward portion, a radially extending first seating surface having a groove and a second seating surface at the inward portion of the teeth, said second surface extending substantially perpendicularly to said first seating surface, said first and said second seating surface being adapted to accommodate cutting inserts having lateral cutting edges on opposite sides and which converge radially outwards, said cutting inserts being of heavy duty material adapted to be mounted on the teeth, said cutting inserts having a rearward first contact surface and a lower second contact surface engaging said first and said second seating surfaces, respectively, said cutting inserts being ground on said supporting teeth and each associated with a corresponding tooth, the cutting inserts further having a key on the rear side having a third contact surface which extends transversely to said first and said second contact surface and cooperates with the groove formed in said first seating surface, the interengagement of said key and said groove being substantially backlash-free, and said cutting inserts being adapted to be removably fixed to the supporting teeth by a clamping means, said clamping means including, a clamping bolt, a clamping pin, a bore on the support tooth and a clamping surface on the rear side of the cutting inserts, wherein the clamping surface coacts with the head of the clamping pin and wherein the pin is led through the bore of the support tooth, said pin being urged away from said cutting insert by the clamping bolt extending transversely to said pin and actuable on the rear side of said support tooth such that said first and said second contact surfaces of the cutting inserts are urged against said first and said second seating surfaces, respectfully, and the third contact surface is urged against the wall of said groove in said support tooth.

* * * * *